United States Patent
Liao et al.

(10) Patent No.: US 12,333,701 B2
(45) Date of Patent: Jun. 17, 2025

(54) FAST AND FUZZY PATTERN GROUPING

(71) Applicant: KLA Corporation, Milpitas, CA (US)

(72) Inventors: Kangjia Liao, Shanghai (CN); Jing Jiao, Milpitas, CA (US); Changqing Hu, Sunnyvale, CA (US); Vikram Tolani, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 391 days.

(21) Appl. No.: 17/857,975

(22) Filed: Jul. 5, 2022

(65) Prior Publication Data

US 2023/0013051 A1   Jan. 19, 2023

Related U.S. Application Data

(60) Provisional application No. 63/220,567, filed on Jul. 12, 2021.

(51) Int. Cl.
*G06V 20/58* (2022.01)
*G06T 7/00* (2017.01)
*G06V 10/74* (2022.01)

(52) U.S. Cl.
CPC .......... *G06T 7/0004* (2013.01); *G06V 10/761* (2022.01); *G06T 2207/20048* (2013.01); *G06T 2207/30148* (2013.01)

(58) Field of Classification Search
CPC ......... G06T 7/0004; G06T 2207/20048; G06T 2207/30148; G06T 2207/1005; G06V 10/761; G06V 2201/06; G06V 10/7715; G06F 18/24147; G02B 13/0085
See application file for complete search history.

(56) References Cited

U.S. PATENT DOCUMENTS

| 8,126,255 | B2 | 2/2012 | Bhaskar et al. |
| 8,664,594 | B1 | 4/2014 | Jiang et al. |
| 8,692,204 | B2 | 4/2014 | Kojima et al. |

(Continued)

FOREIGN PATENT DOCUMENTS

| CN | 112424826 A | * 2/2021 | ............. G06F 18/24 |
| WO | 2007/026349 |   3/2007 | |

OTHER PUBLICATIONS

C. Kofler, G. Spöck and R. Muhr, "Classifying defects in topography images of silicon wafers," 2017 Winter Simulation Conference (WSC), Las Vegas, NV, USA, 2017, pp. 3646-3657, doi: 10.1109/WSC.2017.8248077. (Year: 2017).*

(Continued)

*Primary Examiner* — Bobbak Safaipour
*Assistant Examiner* — Dylan J Sherrillo
(74) *Attorney, Agent, or Firm* — Entropy Matters LLC

(57) ABSTRACT

Methods and systems for determining information for a specimen are provided. One system includes a computer subsystem configured for removing one or more patterns in a specimen image that do not touch a defect detected in the specimen image thereby generating a modified specimen image. The computer subsystem is also configured for generating one or more hash codes for the modified specimen image. In addition, the computer subsystem is configured for assigning the specimen image to one of multiple groups based on a distance between the one or more hash codes and one or more other hash codes generated for a second modified specimen image generated for a second specimen image.

27 Claims, 5 Drawing Sheets

(56) References Cited

U.S. PATENT DOCUMENTS

| | | | |
|---|---|---|---|
| 8,698,093 | B1 | 4/2014 | Gubbens et al. |
| 8,716,662 | B1 | 5/2014 | MacDonald et al. |
| 9,208,576 | B2 | 12/2015 | Eggert et al. |
| 9,222,895 | B2 | 12/2015 | Duffy et al. |
| 9,816,939 | B2 | 11/2017 | Duffy et al. |
| 10,176,202 | B1 | 1/2019 | Newman |
| 10,890,540 | B2 * | 1/2021 | Koopman ........ G01N 21/95607 |
| 11,010,525 | B2 * | 5/2021 | Baidya .................... G06F 30/39 |
| 2006/0190850 | A1 | 8/2006 | Kohle et al. |
| 2014/0376801 | A1 | 12/2014 | Karsenti et al. |
| 2020/0126212 | A1 | 4/2020 | Duffy et al. |
| 2020/0334446 | A1 * | 10/2020 | Fang ..................... G06T 7/0004 |
| 2021/0109437 | A1 * | 4/2021 | Oh ........................... G03F 1/36 |

OTHER PUBLICATIONS

Y. Yuan-Fu and S. Min, "Double Feature Extraction Method for Wafer Map Classification Based on Convolution Neural Network," 2020 31st Annual SEMI Advanced Semiconductor Manufacturing Conference (ASMC), Saratoga Springs, NY, USA, 2020, pp. 1-6, doi: 10.1109/ASMC49169.2020.9185393. (Year: 2020).*

Z. Huang and S. Liu, "Perceptual Image Hashing With Texture and Invariant Vector Distance for Copy Detection," in IEEE Transactions on Multimedia, vol. 23, pp. 1516-1529, 2021, doi: 10.1109/TMM.2020.2999188. (Year: 2020).*

International Search Report for PCT/US2022/036747 mailed Nov. 1, 2022.

\* cited by examiner

Features for kNN : [0.39, 0.07, 0.22, 0.03, 0.14, 0.06, 0.09, 0.05]

FAST AND FUZZY PATTERN GROUPING

BACKGROUND OF THE INVENTION

1. Field of the Invention

The present invention generally relates to methods and systems for determining information for a specimen. Certain embodiments relate to methods and systems for defect or pattern grouping based on hash codes and optionally k-nearest neighbor to methods.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

In many inspection processes, one very useful way to handle the results is to group defects based on the patterns they are located on, within, and/or near. For the sake of ease, all of such patterns are referred to collectively herein as "background patterns." Grouping defects based on their background patterns can be useful for a number of reasons. For instance, if defects can be sorted based on their background patterns, then the background patterns that exhibit the most defectivity can be identified. Those identified background patterns may then be analyzed further to determine why so many defects were detected in them. In addition, if some background patterns are known to not be of interest or prone to nuisances but not real defects, any defects detected in such background patterns can be sorted out and ignored or deleted from the results.

Several methods have been developed to group defects based on their background patterns. One such method includes clipping patches around defect locations from the images and comparing the clipped patches for all defect pairs, one by one. This method also includes putting the defects of high similarity score in the same group and separating defect pairs of low similarity score. Moving the defect pixel-by-pixel, the similarity of defect pairs is determined based on the intensity difference of the two defects. Another such method is similar to the method described above, but replaces the pixel-by-pixel moving by a normalized cross correlation (NCC) algorithm.

Although these and other currently available methods for grouping defects based on the background patterns have been widely implemented, they have several important disadvantages. For example, in both of the methods described above, all defect pairs need to be compared, which is computationally expensive. In particular, if the number of all defects is N, then N*N/2 comparisons are needed. In addition, both of the methods described above cannot handle fuzzy similarity, which means there are some patterns that are very similar in shape but are not exactly the same. In this manner, neither intensity difference nor NCC scores can handle them. In the first method described above, the intensity difference check is very slow. In the worst case, n*n sub-comparisons are needed for a single comparison for each defect pair. Furthermore, the similarity check of both of the methods described above are applied to the whole defect patch. As such, there is no mechanism to focus on the pixels near the defects or the patterns that touch the defects.

Accordingly, it would be advantageous to develop systems and methods for determining information for a specimen that do not have one or more of the disadvantages described above.

SUMMARY OF THE INVENTION

The following description of various embodiments is not to be construed in any way as limiting the subject matter of the appended claims.

One embodiment relates to a system that includes a computer subsystem configured for removing one or more patterns in a specimen image that do not touch a defect detected in the specimen image thereby generating a modified specimen image. The computer subsystem is also configured for generating one or more hash codes for the modified specimen image. In addition, the computer subsystem is configured for assigning the specimen image to one of multiple groups based on a distance between the one or more hash codes and one or more other hash codes generated for a second modified specimen image generated for a second specimen image. The system may be further configured as described herein.

Another embodiment relates to a computer-implemented method for determining information for a specimen. The method includes the removing, generating, and assigning steps described above, which are performed by a computer system. Each of the steps of the method may be performed as described further herein. The method may include any other step(s) of any other method(s) described herein. The method may be performed by any of the systems described herein.

An additional embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
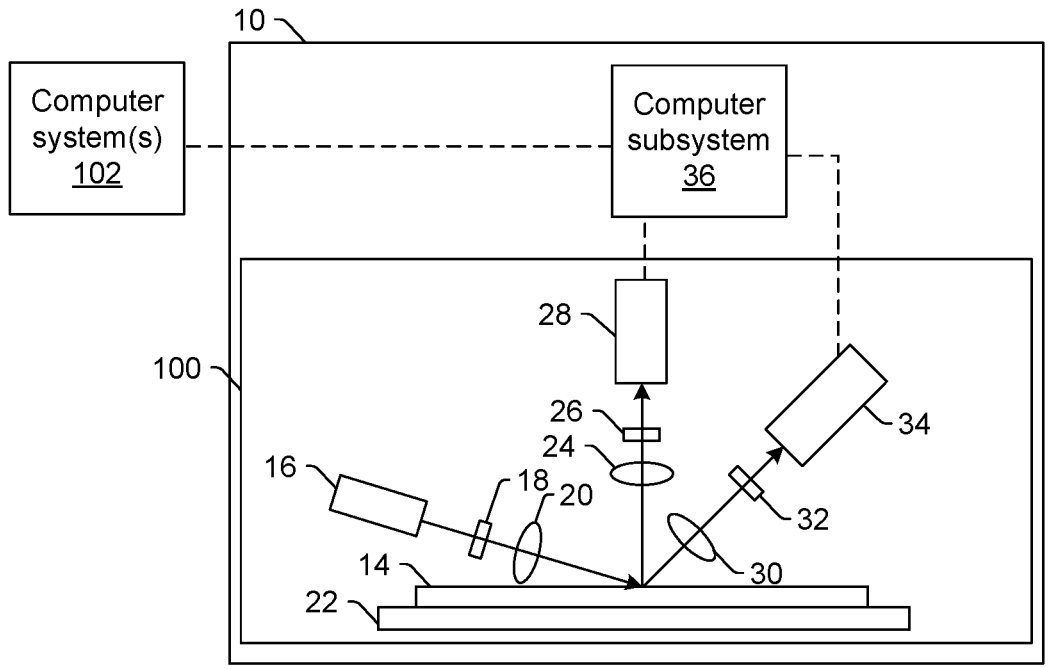
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

"False defects" (which is sometimes used interchangeably with "nuisance defects" or "nuisances") as that term is used herein is generally defined as defects that a user does not care about and/or events that are detected on a specimen but are not really actual defects on the specimen. False defects that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned attributes, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of to DOIs on any given specimen, and one or more of them may be of greater interest to a user than one or more other types. In the context of the embodiments described herein, however, the term "DOIs" is used to refer to any and all real defects on a specimen.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are fast and fuzzy pattern grouping methods and systems that are based on hash codes and optionally a k-nearest neighbor method. The embodiments described herein can be applied to defect classification in the semiconductor industry and other related pattern classification fields. The embodiments utilize an efficient flow of fuzzy grouping for similar defects, which is helpful for improving the accuracy of defect classification. The embodiments described herein also use a new hash code to realize fast, fuzzy grouping and may use a k-dimensional tree (KD-tree) to improve the efficiency of intensity (or other defect attribute) checking of defect pairs.

In some embodiments, the specimen image is generated for a wafer. The wafer may include any wafer known in the semiconductor arts. In another embodiment, the specimen image is generated for a mask, which may include any mask or reticle known in the semiconductor arts. Although some embodiments may be described herein with respect to a mask or masks, the embodiments are not limited in the specimens for which they can be used. For example, the embodiments described herein may be used for specimens such as flat panels, personal computer (PC) boards, and other semiconductor specimens.

One embodiment of a system configured for determining information for a specimen is shown in FIG. 1. In some embodiments, system 10 includes imaging subsystem 100 configured to generate the specimen images described further herein. The imaging subsystem includes and/or is coupled to a computer subsystem, e.g., computer subsystem 36 and/or one or more computer systems 102. The imaging subsystem shown in FIG. 1 is configured to generate the specimen images using light. In this manner, in one embodiment, the specimen image is generated using light. In the embodiments shown in FIG. 1, the imaging subsystem is configured as a light-based imaging subsystem. However, in other embodiments described herein, the specimen image is generated using electrons or charged particles. In this manner, in other embodiments, the imaging subsystem is configured to generate the specimen images using electrons.

In general, the imaging subsystems described herein include at least an energy source, a detector, and a scanning subsystem. The energy source is configured to generate energy that is directed to a specimen by the imaging subsystem. The detector is configured to detect energy from the specimen and to generate output responsive to the detected energy. The scanning subsystem is configured to change a position on the specimen to which the energy is directed and from which the energy is detected.

In the light-based imaging subsystems described herein, the energy directed to the specimen includes light, and the energy detected from the specimen includes light. For example, in the embodiment of the system shown in FIG. 1, the imaging subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously. In addition, the illumination subsystem may be configured so that the light illuminates one side of the specimen and is transmitted by the specimen for detection on the other side of the specimen. Such an illumination subsystem and the imaging subsystem in which it is included may have any suitable configuration known in the art.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The imaging subsystem further includes one or more detection channels. At least one of the detection channel(s) includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors. For instance, if the system is configured as an inspection system, the computer subsystem may be configured to detect events (e.g., defects and potential defects) on the specimen using the output of the detectors. Detecting the events on the specimen may be performed as described further herein.

Computer subsystem 36 may be further configured as described herein. For example, computer subsystem 36 may be configured to perform the steps described herein. As such, the steps described herein may be performed "on-tool," by a computer subsystem that is coupled to or part of an imaging subsystem. In addition, or alternatively, computer system(s) 102 may perform one or more of the steps described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, in another embodiment, the imaging subsystem is configured as an electron beam imaging subsystem. In an electron beam imaging subsystem, the energy directed to the specimen includes electrons, and the energy detected from the specimen includes electrons. In one such embodiment shown in FIG. 1a, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

Figure 1A:
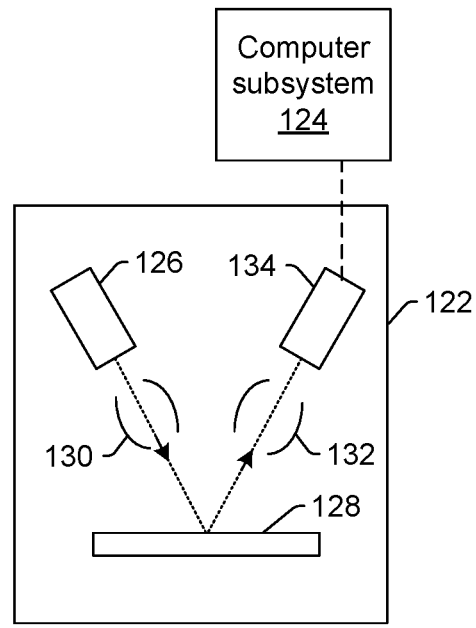

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect events on the specimen using output generated by detector 134, which may be performed as described above or in any other suitable manner. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam imaging subsystem that may be included in the embodiments described herein. As with the optical imaging subsystem described above, the electron beam subsystem configuration described herein may be altered to optimize the performance of the imaging subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 1a except that the electron beam source may be replaced with any suitable ion beam source known in the art. In addition, the imaging subsystem may include any other suitable ion beam imaging system such as those included in commercially available focused ion beam (FIB) systems, helium ion microscopy (HIM) systems, and secondary ion mass spectroscopy (SIMS) systems.

As further noted above, the imaging subsystem may be configured to have multiple modes. In general, a "mode" can be defined by the values of parameters of the imaging subsystem used to generate output for the specimen. Therefore, modes that are different may be different in the values for at least one of the imaging parameters of the imaging subsystem (other than position on the specimen at which the output is generated). For example, for a light-based imaging subsystem, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging subsystem may include more than one illumination channel. As such, different illumination channels may be used for different modes.

The multiple modes may also be different in illumination and/or collection/detection. For example, as described further above, the imaging subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The imaging subsystem may be configured to scan the specimen with the different modes in the same scan or different scans, e.g., depending on the capability of using multiple modes to scan the specimen at the same time.

In one embodiment, the image is generated by an imaging subsystem configured for inspection of the specimen. In this manner, the systems described herein may be configured as inspection systems. However, the systems described herein may be configured as another type of semiconductor-related quality control type system such as a defect review system and a metrology system. For example, the embodiments of the imaging subsystems described herein and shown in FIGS. 1 and 1a may be modified in one or more parameters to provide different imaging capability depending on the application for which they will be used. In one embodiment, the imaging subsystem is configured as an electron beam defect review subsystem. For example, the imaging subsystem shown in FIG. 1a may be configured to have a higher resolution if it is to be used for defect review or metrology rather than for inspection. In other words, the embodiments of the imaging subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging subsystem 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

Figure 2:
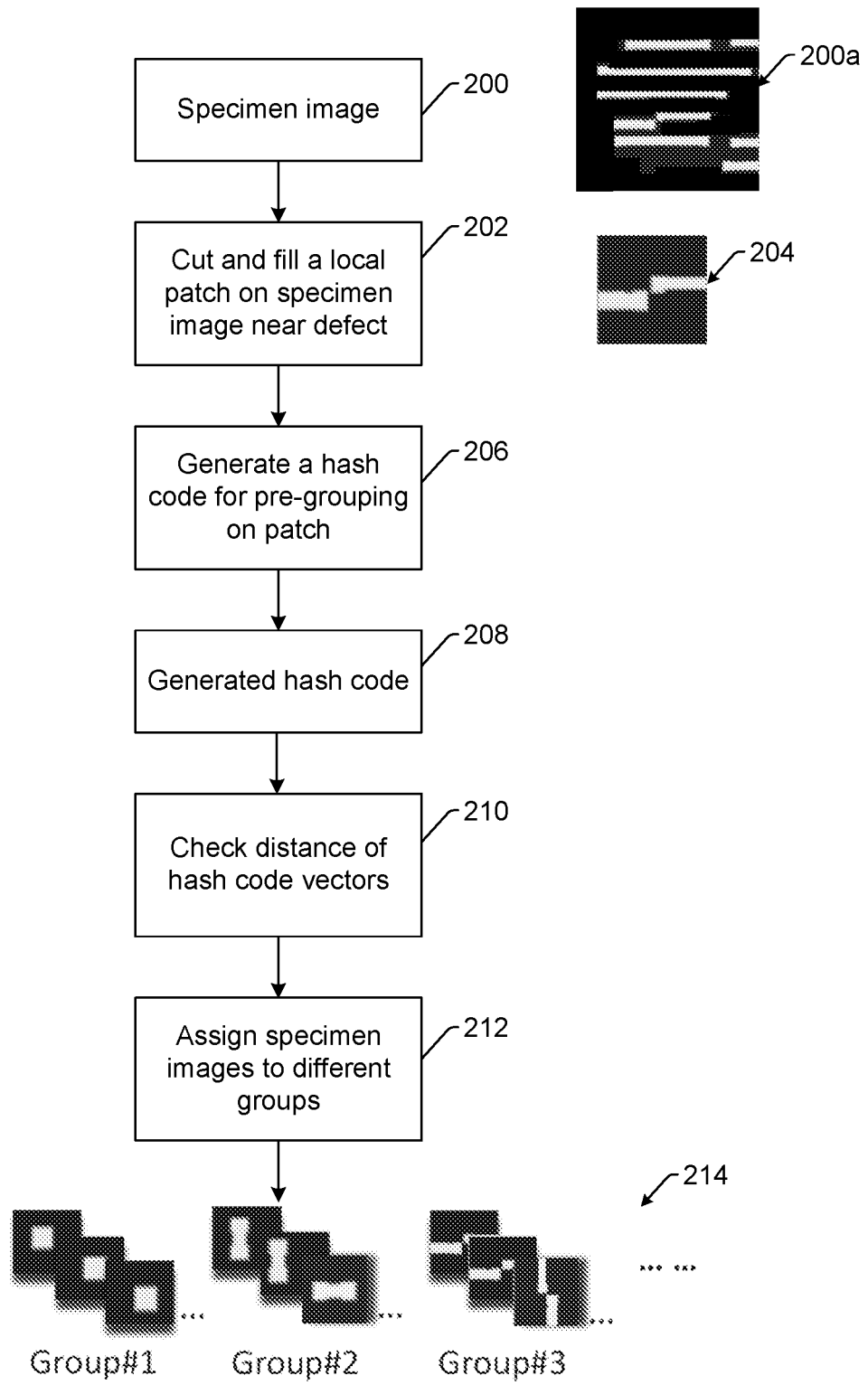
FIG. 2 is a flow chart illustrating an embodiment of steps that may be performed for assigning specimen images to groups.

The system includes a computer subsystem, which may include any configuration of any of the computer subsystem(s) or system(s) described above. The computer subsystem is configured for removing one or more patterns in a specimen image that do not touch a defect detected in the specimen image thereby generating a modified specimen image. For example, as shown in FIG. 2, the computer subsystem may acquire specimen image 200, one non-limiting example of which is shown by image 200a. Although some embodiments are described herein with respect to a specimen image, the steps described herein may be performed for more than one specimen image generated for a single specimen in a single process, including up to every specimen image generated for the specimen in the process. The specimen images used by the embodiments described herein may include raster images or any other suitable specimen image known in the art such as a mask design image that shows the patterns on the mask with sufficient resolution so that the steps described herein can be performed using the images.

The computer subsystem may acquire the specimen images as described further herein. For example, the system may include one or more of the imaging subsystems described herein, and the computer subsystem may acquire the images from the detector(s) of the imaging subsystem(s) or may generate the images from the output of the detector(s). In another example, the computer subsystem may acquire the specimen images from a storage medium (not shown) in which the images have been stored by another method or system.

Removing one or more patterns in a specimen image that do not touch a defect detected in the specimen image may include, for example, cutting and filling a local patch on specimen near a defect, as shown in step 202 of FIG. 2. In other words, this step may include clipping a patch image from a raster image and then removing the patterns that do not touch a defect. More specifically, step 202 may include cutting any patterns that do not touch a defect from the image and then filling the areas where patterns were cut with background pixels having the same or substantially the same values as other non-pattern and non-defect portions of the image (i.e., unpatterned and non-defective portions of the image). This step may also include reducing the size of the specimen image so that the modified specimen image focuses primarily on the patterns that touch the defect rather than containing only a few patterns, possibly the defect, and then mainly background or unpatterned, non-defective pixels.

This step may generate modified specimen image 204, which is only shown here as a non-limiting example to facilitate understanding of the embodiments. As can be seen by comparing specimen image 200a to modified specimen image 204, prior to step 202, the specimen image includes more patterns than that shown in the modified specimen image, but any patterns that do not touch the defect were removed thereby resulting in modified specimen image 204. In addition, as can be seen by comparing specimen image 200a to modified specimen image 204, step 202 included reducing the size of the specimen image by eliminating many of the pixels that no longer contained patterns because they were removed and/or retaining only a predetermined number of pixels centered on the detected defect location. As described above, the patterns that do not touch the defect may be eliminated and then the size of the specimen image may be reduced, but these steps may be performed in the reverse order as well.

In the embodiments described herein, raster images may be used to identify which patterns touch the defect, and by removing any patterns that do not touch the defect, the embodiments can focus only on those remaining patterns in the grouping steps described herein. This improvement over other currently used systems and methods helps to group more similar defects together. For example, by only keeping the patterns that touch the defects, the embodiments described herein can tolerate (i.e., will largely be unaffected by) different surrounding patterns of the defects.

The computer subsystem is also configured for generating one or more hash codes for the modified specimen image. In this manner, the computer subsystem generates hash codes for the patches generated as described above. For example, as shown in step 206 of FIG. 2, the computer subsystem may generate a hash code for pre-grouping on the patch thereby resulting in generated hash code 208. The steps shown in FIG. 2 may be a pre-grouping phase of the method if the grouping shown in this figure is followed by another re-grouping or final grouping such as that shown in FIG. 6 described further below. However, this pre-grouping may be referred to simply as grouping when it is not followed by another grouping method or step. In this manner, the computer subsystem may generate at least one hash code for each modified specimen image of interest, i.e., hash code 1 for modified specimen image 1, hash code 2 for modified specimen image 2, etc. As described further herein, for one or more (and possibly all) of the modified specimen images, more than one hash code may be generated, one for the original modified specimen image and one for another (or each) altered version of the modified specimen image.

In some embodiments, generating the one or more hash codes includes generating a frequency domain image from the modified specimen image, selecting low frequency components of the frequency domain image, and converting the low frequency components into vectors for the one or more hash codes. In this manner, the embodiments described herein can define and use a new type of hash code, which is only defined in the frequency domain and keeps only the low frequency part of the modified specimen image. As such, the hash code can tolerate (i.e., by largely unaffected by) some minor differences between patterns such as relatively small jogs and other optical proximity correction (OPC) features on patterns, like hammerheads, serifs, etc. In other words, if two defects are detected in two different patterns that are alike except for some of the minor differences described above, by focusing primarily (or only) on the low frequency components of the modified specimen images in hash code generation, the hash codes so generated for the two defects will likely be similar enough that the two defects will be correctly grouped together.

These low frequency based hash codes therefore are one way that the embodiments described herein can introduce some fuzziness into the defect or image grouping. Enabling some fuzziness in the defect or pattern grouping methods described herein is important and advantageous because it can be substantially difficult to enable a computer system to group defects or patterns that are not exactly the same, but would be identified by a user as being similar enough to be grouped together. The hash codes described herein eliminate such difficulty by being able to tolerate differences in defects and patterns that are otherwise similar enough to be grouped together. Using the hash codes generated as described herein also makes the defect or pattern grouping described herein much faster than other currently used methods and systems for grouping, including those described in the background section.

Figure 3:
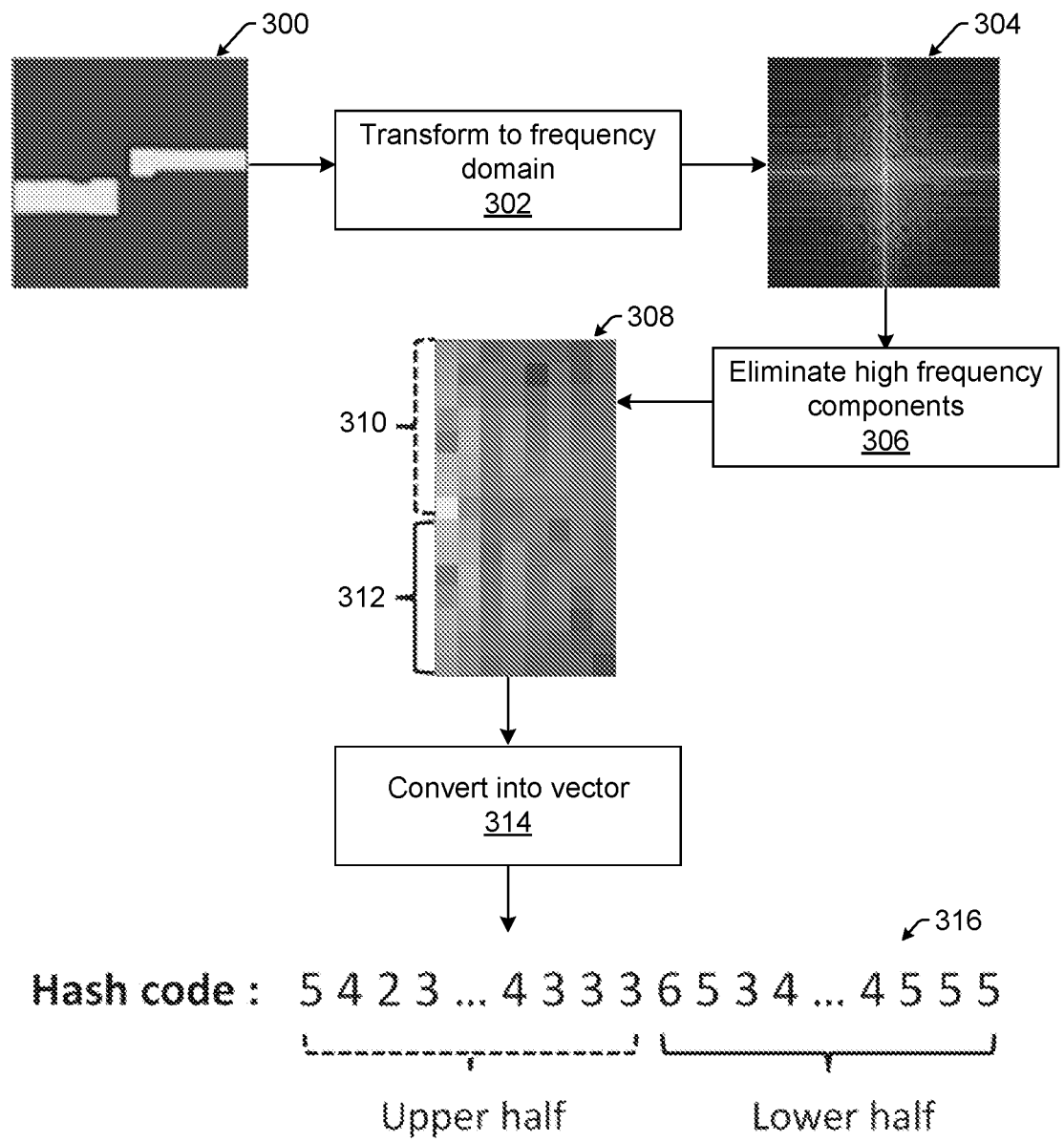
FIG. 3 is a flow chart illustrating one embodiment of steps that may be performed for generating a hash code for a modified specimen image.

One embodiment of such steps is shown in FIG. 3. In this embodiment, modified specimen image 300, which in this case is the same as modified specimen image 204, is input to transform to frequency domain step 302. Transforming the image to the frequency domain may be performed using a function such as Abs(FFT(image)), but may also be performed using any other suitable Fast Fourier transform function known in the art. The result of step 302 may be frequency domain image 304, which shows the frequency domain amplitude on a logarithm scale. The frequency domain image is then input to eliminating the high frequency components step 306 to thereby only keep the low frequency components. This step may include selecting only a portion of the frequency domain image that includes the lowest frequency components, but not necessarily all of the low frequency components. "Low frequency" as that term is used herein is defined by a predetermined threshold defined by a user. For example, the lowest frequency components may be identified in the frequency domain image, and then based on a predetermined frequency threshold, other relatively low frequency components may be selected for retention and/or a predetermined patch size surrounding the lowest frequency components may be selected. Identifying and selecting such low frequency components may otherwise be performed in any suitable manner known in the art.

For frequency domain image 304, step 306 may generate patch image 308, which in some instances may be a 15×8 patch image, but may have any other suitable size. Patch image 308 may include upper half 310 and lower half 312. The entire patch image may be input to convert into vector step 314, in which the patch image is converted into hash code 316. This step may simply include flattening the two-dimensional (2D) 15×8 matrix of pixel values into a one-dimensional (1D) vector, which may be performed in any suitable manner known in the art. As shown in FIG. 3, one portion of the hash code labeled in FIG. 3 as "upper half" corresponds to the upper half of the patch image and another portion of the hash code labeled in FIG. 3 as "lower half" corresponds to the lower half of the patch image.

In pre-grouping, then, a type of hash code may be introduced to describe the fuzzy information of defect patches. For example, the hash codes described herein support variations in the specimen image including rotation, flipping, translation, or some combination thereof. In this manner, the hash codes and the grouping performed using them can advantageously tolerate different versions of the specimen image such as rotation/flipping/translation. In other words, the embodiments described herein define and use a new type of hash code, which can tolerate some minor differences of patterns such as orientation of the patterns with respect to the defect, specimen, or tool and position of the patterns within the modified specimen images. In this manner, even if two defects are detected in two different patterns that are alike except for some of the orientation and/or position differences described above, the hash codes generated as described herein enable the two defects to be correctly grouped together despite those differences in the patterns. These pattern-orientation/position-flexible hash codes are therefore one way that the embodiments described herein introduce fuzziness into the defect or image grouping. Enabling some fuzziness in the defect or pattern grouping methods described herein is important for the same reasons described further above.

In one embodiment, the one or more hash codes include a first hash code for the modified specimen image and a second hash code for a rotated version of the modified specimen image. In another embodiment, the one or more hash codes includes a first hash code for the modified specimen image and a second hash code for a flipped version of the modified specimen image. In a further embodiment, the one or more hash codes include a first hash code for the modified specimen image and a second hash code for a translated version of the modified specimen image. Therefore, the one or more hash codes generated by the embodiments described herein may include two or more hash codes for the same modified specimen image, one hash code for the original modified specimen image and possibly other hash code(s) for other version(s) of the original modified specimen image that have been rotated, flipped, translated, or some combination thereof. These hash codes may be generated as described further herein.

Figure 4:
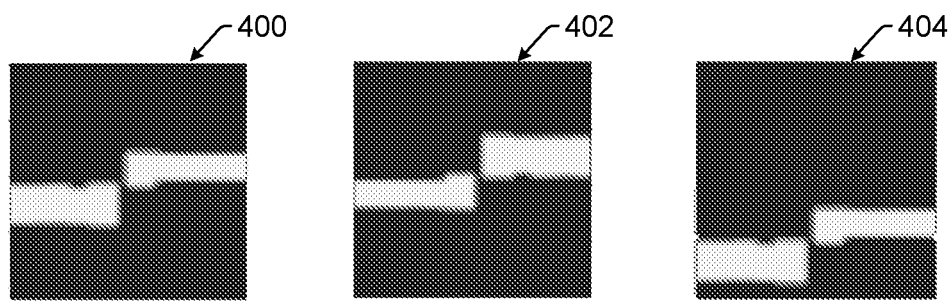
FIG. 4 includes an embodiment of a modified specimen image and embodiments of altered versions, generated by rotation or translation, of the modified specimen image.

FIG. 4 shows 3 different versions of the same modified specimen image. In this embodiment, modified specimen image 400 is the original modified specimen image. Modified specimen image 402 is a rotated version of modified specimen image 400 that has been generated by rotating modified specimen image 400 by 180 degrees. Modified specimen image 404 is a translated version of modified specimen image 400 that has been generated by shifting the patterns in the original modified specimen image downwards. The hash codes described herein advantageously do not change when two images are the same except for only translation or rotation by 180 degrees. Flipping is very similar to rotation. In this manner, the hash code can tolerate versions of a modified specimen image generated by translation, rotation, and flipping, and the three modified specimen images shown in FIG. 4 will have the same hash code.

Figure 5:
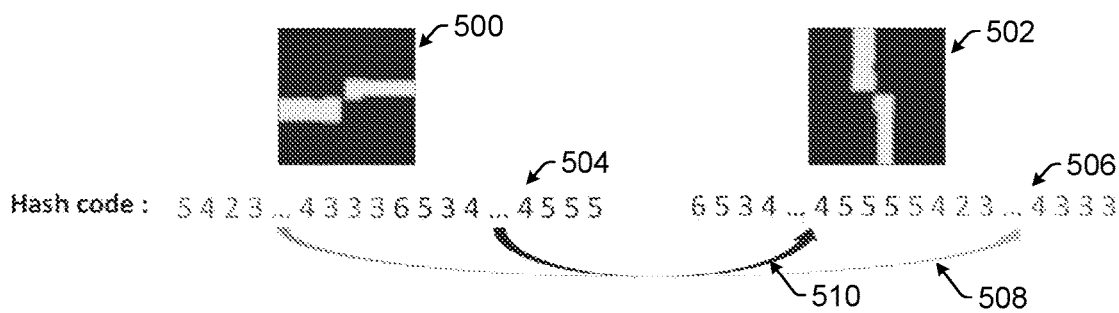
FIG. 5 is a schematic diagram illustrating embodiments of a modified specimen image and an altered version, generated by rotation, of the modified specimen image and examples of hash codes that may be generated for the different modified specimen images.

FIG. 5 shows how the hash code changes under rotation. In this figure, modified specimen image 500 is the original modified specimen image, and modified specimen image 502 is a rotated version of the original modified specimen image that has been generated by rotating the original modified specimen image by 90 or 270 degrees. Hash code 504 may be generated for the original modified specimen image as described herein, and hash code 506 may be generated for the rotated version of the image. For a 90 or 270 degree rotation of the modified specimen image, the hash code for the rotated version may be generated by exchanging the first and second parts of the hash code. In other words, parts 508 of hash codes 504 and 506 are the same but in different positions of the hash codes, and parts 510 of hash codes 504 and 506 are the same but in different positions of the hash codes. Other than exchanging the two parts of the hash codes, no other changes to the original hash code are needed to accurately reflect the 90 or 270 degree rotation.

In general then, different hash codes for different versions of the same modified specimen image may be generated in a few different ways. For example, the original modified specimen image may be rotated, flipped, translated, etc. to generate one or more versions of the original modified specimen image, and then hash codes can be separately and independently generated for each of the different versions of the original modified specimen image. In another example, the one or more versions of the original modified specimen images do not actually have to be generated if, as the inventors have discovered, the hash code is known to change in certain ways (or not change at all) for different versions of the modified specimen image. Therefore, a hash code can be generated for the original modified specimen image, and then the generated hash code can be manipulated to create hash code(s) for one or more versions of the original modified specimen image. In one such example, the computer subsystem may only need to exchange the upper and lower parts of the hash code (e.g., the upper half of the hash code shown in FIG. 3 and the lower half of the hash code shown in FIG. 3 may be switched as shown in FIG. 5) to handle rotation and flipping by 90 or 270 degrees, which is substantially fast.

To reiterate, then, one of the advantages of the hash code described herein is that it is invariant to shift, 180 degree rotation and flipping of patterns. In addition, for 90 or 270 degrees rotation, only the upper half and lower half of the hash code need to be exchanged. Based on the above two properties, the similarity score between rotated and flipped images is substantially high. Thus, rotated and flipped patterns can be grouped together as further described herein. We therefore can say that this hash code can tolerate rotation and flipping. For two patterns that are the same except for 90 or 270 degrees rotation, the embodiments described herein can identify their similarity by flipping the two halves of one of the hash codes and checking the similarity between 1) the original hash codes for both patterns and 2) the original hash code for one pattern and the flipped hash code for the other pattern. In this manner, when two images from different fields of view (FOVs) on the specimen contain patterns that are the same except for rotation or flipping, they can be grouped together using the hash codes described herein, which is an advantage of this hash code.

In this manner, generating one or more hash codes for a modified specimen image as described herein may only include generating one hash code for each pattern from the modified specimen image itself. The hash codes generated for two patterns will be the same (or substantially the same) if the only difference between the two patterns is that one is rotated by 180 degrees, flipped, or translated with respect to the other. To generate any additional hash code for any of the patterns, the original hash code may be used and the two halves of the original hash code may be exchanged to generate another hash code. In this manner, the modified hash code may be generated from the original hash code and without using the modified specimen image. This hash code can then be used to identify patterns that are the same except for 90 or 270 degrees rotation in one of the patterns with respect to another of the patterns. To tolerate differences such as any of the rotation, flipping, or translation described herein then, we can check similarity two times for each pair of patterns, one check using the original hash codes, and another check using one hash code generated by exchanging the first and second halves of its original hash code. As long as one of the checks is similar, the two patterns can be considered to be similar.

The computer subsystem is further configured for assigning the specimen image to one of multiple groups based on a distance between the one or more hash codes and one or more other hash codes generated for a second modified specimen image generated for a second specimen image. For example, as shown in step 210 of FIG. 2, the computer subsystem may check the distance of hash code vectors and then assign the specimen images to different groups, as shown in step 212. In this manner, the specimen images may be assigned to different groups 214 including, in this non-limiting example, Group #1, Group #2, Group #3, etc. These steps may be performed as described further herein.

In one embodiment, the computer subsystem is configured for determining the distance, and the distance between the one or more hash codes and the one or more other hash codes includes a cosine vector distance. In this manner, the embodiments described herein may use cosine vector distance to check the similarity between patterns, which can advantageously be performed substantially fast. For example, the following hash code examples, $h_1$ and $h_2$, are for modified specimen images 1 and 2, respectively.

$h_1$: 5 4 2 3 . . . 4 3 3 3 6 5 3 4 . . . 4 5 5 5
$h_2$: 5 3 3 1 . . . 3 1 1 2 6 4 5 3 . . . 3 4 1 3

Each of the modified specimen images are generated for a different one of the specimen images, one for specimen image 1 and one for specimen image 2, respectively. In this manner, for each of the specimen images in which a defect was detected (or for each specimen image of interest), at least one modified specimen image may be generated by removing patterns in the image that do not touch the defect detected in the specimen image and then at least one hash code may be generated for the at least one modified specimen image.

The cosine vector distance between the two hash codes for the two modified specimen images can then be defined as follows:

$$d_{cos}(h_1, h_2) = \frac{h_1 \cdot h_2}{|h_1||h_2|}$$

In this manner, the embodiments described herein may pre-group defects (by pre-grouping the modified specimen images corresponding to the defects) based on the similarity of their hash codes, and the similarity of two hash codes can be defined by the cosine vector distance between them. In other words, in the pre-grouping phase, the above formula can be used to determine whether two patterns (in two modified specimen images) can be grouped together.

In another embodiment, the computer subsystem is configured for determining the distance between the one or more hash codes and the one or more other hash codes by determining a first cosine vector distance between a first of the one or more hash codes and a first of the one or more other hash codes, determining a second cosine vector distance between the first of the one or more hash codes and a second of the one or more other hash codes for an altered version of the second modified specimen image, determining a maximum of the first and second cosine vector distances, and setting the distance between the one or more hash codes and the one or more other hash codes equal to the maximum.

In this embodiment, the altered version may be altered in any suitable manner described herein. For example, in one such embodiment, the altered version of the second modified specimen image is a rotated version of the second modified specimen image. In a further such embodiment, the altered version of the second modified specimen image is a flipped version of the second modified specimen image. In an additional such embodiment, the altered version of the second modified specimen image is a translated version of the second modified specimen image. All of these modified versions may be configured as described herein, and their hash codes may be generated as described herein.

In one such embodiment, using the hash code examples, $h_1$ and $h_2$, described above, to tolerate rotation in the modified second image, a second hash code, $\widetilde{h_2}$, may be generated for a rotated version of the modified second image.

$h_1$: 5 4 2 3 . . . 4 3 3 3 6 5 3 4 . . . 4 5 5 5
$h_2$: 5 3 3 1 . . . 3 1 1 2 6 4 5 3 . . . 3 4 1 3
$\widetilde{h_2}$: 6 4 5 3 . . . 3 4 1 3 5 3 3 1 . . . 3 1 1 2

In this example, $\widetilde{h_2}$ is for a 90 or 270 degree rotated patch image. As can be seen by comparing $h_2$ and $\widetilde{h_2}$, $\widetilde{h_2}$ can be obtained from $h_2$ simply by exchanging the first and second halves of $h_2$ with each other. Determining the distance between the hash code for the first modified specimen image and the two hash codes for the second modified specimen image may then be performed using the following function:

$$d_{cos} = \text{MAX}(d_{cos}(h_1, h_2), d_{cos}(h_1, \widetilde{h_2}))$$

In other words, the cosine vector distance may be determined between $h_1$ and $h_2$ and between $h_1$ and $\widetilde{h_2}$, and then the maximum of those two cosine vector distances may be set to the cosine vector distance between modified specimen images 1 and 2. In this manner, the computer subsystem may generate the hash codes of patterns after rotation/flipping operations by simple transformation, and the grouping algorithm can tolerate translation and 90 degree/180 degree/270 degree rotation. The computer subsystem can then determine if the hash code for each pattern matches the hash code for each other pattern.

In pre-grouping, then, checking the similarity of two patterns may include checking both the altered version and the original version. Checking different versions of the patterns is what makes the pre-grouping tolerant to variations including things like 90 and 270 degree rotations and other variations described herein. In addition, the embodiments described herein do not actually need to rotate a patch by 90 or 270 degrees or create any other versions of the patch by flipping or translating the patterns. Instead, the two halves of the hash code can be swapped for 90 or 270 degree rotated patterns and should be the same for flipped or translated patterns.

In one such embodiment, assigning the specimen image to the one of the multiple groups includes assigning the specimen image and the second specimen image to the one of the multiple groups if the distance between the one or more hash codes and the one or more other hash codes is greater than a threshold. For example, using the above example again, the $d_{cos}$ value may be compared to a threshold, e.g., 0.98. If the $d_{cos}$ value is greater than the threshold, then the two specimen images corresponding to the two modified specimen images may be grouped together. The cosine vector distance that is compared in this manner may include any of the cosine vector distances determined as described herein, whether that is a cosine vector distance determined using only the original modified specimen images or a cosine vector distance determined using the original modified specimen images and one or more altered versions of the modified specimen image(s). In other words, the cosine vector distance used in this step may be determined using only one hash code for each modified specimen image or more than one hash code for one or more of the modified specimen images being compared to each other.

In some embodiments, the computer subsystem is configured for classifying defects detected on the specimen by assigning a first classification to the specimen image and all other specimen images assigned to the one of the multiple groups and assigning a second classification to all additional specimen images assigned to a second of the multiple groups. In this manner, the defects in group 1 may be assigned one classification, the defects in group 2 may be assigned another classification, and so on. In other words, all of the defects in one of the groups described herein may be assigned the same classification, all of the defects in another of the groups described herein may be assigned the same classification, and so on. Classification of these groups may be performed if the re-grouping described further herein is not also performed for the multiple groups. In instances in which the re-grouping described further herein is performed, classification of the defects assigned to the groups may not be performed because the grouping of the defects will be refined in the re-grouping.

Whether the classification of the defects is performed at this stage or after re-grouping, classification may be performed in the same way. In general, the defects or patterns described herein may be classified in any suitable manner known in the art. In other words, the embodiments described herein are not limited to any particular classification method. The classifications may be performed in a couple of different ways such as classifying defects as actual defects or nuisances and/or classifying defects as one or more types of defects, e.g., defect type 1, defect type 2, etc., which may include any suitable types of defects. The classifying may also include comparing the defects and/or the patterns to known types of defectivity for the specimen and then assigning a classification to the defects in a group based on how similar they are to those known defects and/or patterns. In other instances, the classifying may not be performed based on foreknowledge of the expected defects, and the classifying may be performed based on any information that can be determined about the defects and the patterns from the specimen images or any images or information determined therefrom. Such classifying may be performed, for example, when defect discovery is being performed for the specimen.

As described above, the grouping shown in FIG. 2 may be a kind of pre-grouping, which may be followed by a re-grouping. Several embodiments for that re-grouping will now be described. In one embodiment, the computer subsystem is configured for re-assigning the specimen image assigned to the one of the multiple groups to one of multiple final groups based on an attribute of the defect detected in the specimen image. This re-grouping step may be performed for each of the groups produced by the pre-grouping. In other words, although some embodiments may be described herein as being performed for one of the multiple groups or one of the specimen images assigned to one of the multiple groups, these steps may be independently and separately performed for each of the multiple groups (or at least two or more of the multiple groups) and for any or all of the specimen images assigned to the multiple groups. Therefore, this re-grouping may separate the defects assigned to one group in pre-grouping into multiple different final groups. The re-grouping phase may therefore refine the groups produced by the pre-grouping so that, for example, different classes of defects detected in the same or similar background pattern(s) can be separated from each other while also keeping together the defects that are detected in the same or similar background pattern(s) and appear to have at least one characteristic or attribute that is the same or similar. Re-assigning the specimen images may be performed as described further herein.

In one such embodiment, the re-assigning includes finding the k nearest defects for the defect from defects detected in other specimen images assigned to the one of the multiple groups using a k nearest neighbor (kNN) method, determining a difference between the attribute of the defect and the attribute of one of the k nearest defects, determining if the difference is less than a threshold, and when the difference is less than the threshold, assigning the specimen image and one of the other specimen images corresponding to the one of the k nearest defects to the one of the multiple final groups. In this manner, in re-grouping, the computer subsystem checks the attribute differences of defect pairs in the same pre-group.

In principle, when re-grouping, the attribute, e.g., intensity, difference between each pair of two defects should be examined, but this is substantially time consuming. In the embodiments described herein, the computer subsystem may use kNN to search the k nearest neighbors for each defect in the same pre-group. kNN (KD-tree) is used to avoid comparing all defect pairs. Using kNN before checking the similarity between the attributes of the defects can advantageously help avoid unnecessary attribute checks between completely dissimilar defects. For example, one significant advantage of kNN is to find the k nearest defects, then the computer subsystem can just examine the attribute, e.g., intensity, difference between a defect and its k nearest defects. Other defects can be ignored because it is already established that they are substantially different than the defect.

Avoiding unnecessary attribute checks is substantially important for accelerating the grouping flow. For example, let the k in kNN be k0, the number of comparisons can be reduced to k0*N from N*N/2. The k value used in the embodiments described herein may be an empirical value, e.g., 10, and can be different in different applications. The computer subsystem may then check the differences in the attribute of each defect and its k nearest defects found in the previous step. In some instances, the modified specimen images for the defect and its k nearest defects may be aligned to each other so that the attributes can be more accurately determined and compared. This alignment may be performed in any suitable manner known in the art. In each pre-group, the computer subsystem may further group the defects with similar attributes using a union-finding algorithm. These steps may be further performed as described herein.

Figure 6:
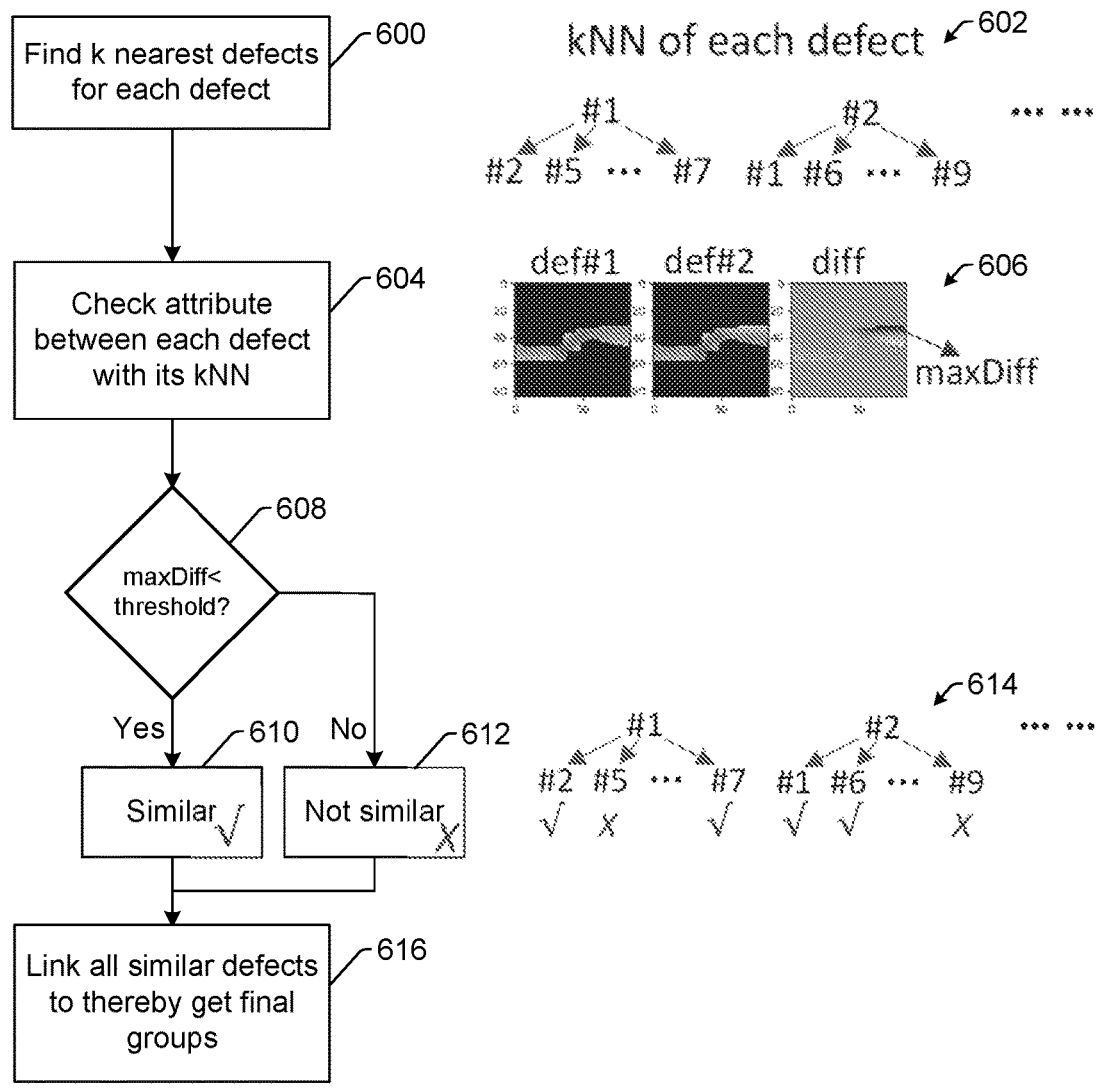
FIG. 6 is a flow chart illustrating an embodiment of steps that may be performed for assigning specimen images in one group to final groups.

FIG. 6 illustrates one embodiment of steps that may be performed for re-grouping. As shown in step 600 of FIG. 6, the computer subsystem may find the k nearest defects for each defect, which may be performed using a kNN method. In one such embodiment, the kNN method is a k-dimensional tree (KD-tree), one example of which is shown in FIG. 6 as tree 602. More specifically, KD-tree 602 shows the kNN of each defect. In this example, different defects are represented in the tree with different numbers. So a first defect is called #1, a second defect is called #2, and so on. As shown in the KD-tree, one tree may be generated for each defect that shows each of its k nearest defects below that defect. For example, for defect #1, as shown in the first tree, the k nearest defects may be defects #2, #5, . . . , #7. For defect #2, as shown in the second tree, the k nearest defects may be defects #1, #6, . . . , #9. Additional trees may be generated for each other defect (or for as many defects as desired). When using a KD-tree based kNN algorithm in the embodiments described herein, the time complexity of searching for kNN for an input is $O(\log(N))$, where N is the number of patterns stored in the KD-tree. The KD-tree can accelerate the algorithm significantly.

While a KD-tree may be particularly suitable for use in the embodiments described herein, the embodiments are not limited to using only a KD-tree for the steps described above. For example, many other tree structures can be used for this step such as a ball tree.

As shown in step 604 of FIG. 6, the computer subsystem may check the attribute between each defect with its kNN. FIG. 6 shows example 606 of such checking. In particular, as described above, one of the k nearest defects for defect #1 is defect #2. Therefore, in example 606, the modified specimen image for defect #1, "def #1," may be subtracted from the modified specimen image for defect #2, "def #2" (or vice versa), to thereby generate a difference image, "diff." The maximum value of the attribute, "maxDiff," being used for this step may then be determined from the difference image. The attribute used in this step may be determined using any of the images (e.g., specimen images, modified specimen images, gradient images, etc.) described herein. In addition, the attribute may or may not be checked using a difference image. For example, a value such as the maximum of the attribute of a first defect may be subtracted from the maximum of the attribute of a second defect thereby determining a difference between the attribute without generating any sort of difference image.

In another such embodiment, the attribute of the defect is an intensity of the defect. For example, for systematic false defect filtering, the intensity of the defects may be used to separate real and false defects. Intensity change may be the most significant indicator that a defect is a real defect. In a further such embodiment, the attribute of the defect is a color of the defect. In some such embodiments, the attribute of the defect is a size of the defect. In an additional such embodiment, the attribute of the defect is an aspect ratio of the defect. For example, in addition to intensity, other attributes were used in the embodiments described herein such as defect color, defect size, and aspect ratio. Defects with substantially different size, color, or aspect ratio can then be separated.

Of course, the defect attributes described above are not a comprehensive list of all of the defect attributes that can be used in the re-grouping described herein, and the defect attribute or attributes that are used may vary depending on the specimen and the types of defects expected to be detected thereon and even what their attribute differences are expected to be. For example, contrast, texture, roughness, energy, etc. are all defect attributes that may be useful for the re-grouping described herein. Furthermore, although the embodiments are described herein as using a defect attribute for re-grouping, it is certainly possible that more than one attribute can be used for re-grouping, some of which are described further herein. These attributes can be different types of attributes like defect intensity and defect size and can also be different values of the same type of one different attribute like the different intensities that are described further herein.

As shown in step 608 of FIG. 6, the maxDiff may be compared to a threshold to determine if the maxDiff is less than the threshold. If the maxDiff is less than the threshold, then in step 610 of FIG. 6, defects #1 and #2 are determined to be similar. If the maxDiff is not less than the threshold, then in step 612, defects #1 and #2 are determined to be not similar. These results may be shown graphically as shown by example 614 in which the results of comparing the maxDiff to the threshold are shown below each of the k nearest neighbors of each of the defects.

In some instances, the defects may be sorted in descending order of residue in each group. For example, in each final group, the defects may be sorted according to signal strength of defects, from highest to lowest signal. Sorting may be performed in certain instances, e.g., for a relatively large group and depending on the application. In one such example, most defects in a pre-group may be false defects while only a few defects are real defects. So, in this case, after sorting, only the top few defects are likely to be true defects. This sorting step may be performed differently or eliminated depending on the application for which the embodiments are being used. As shown in step 616 of FIG. 6, the computer subsystem may link all similar defects to thereby get final groups.

Figure 7:
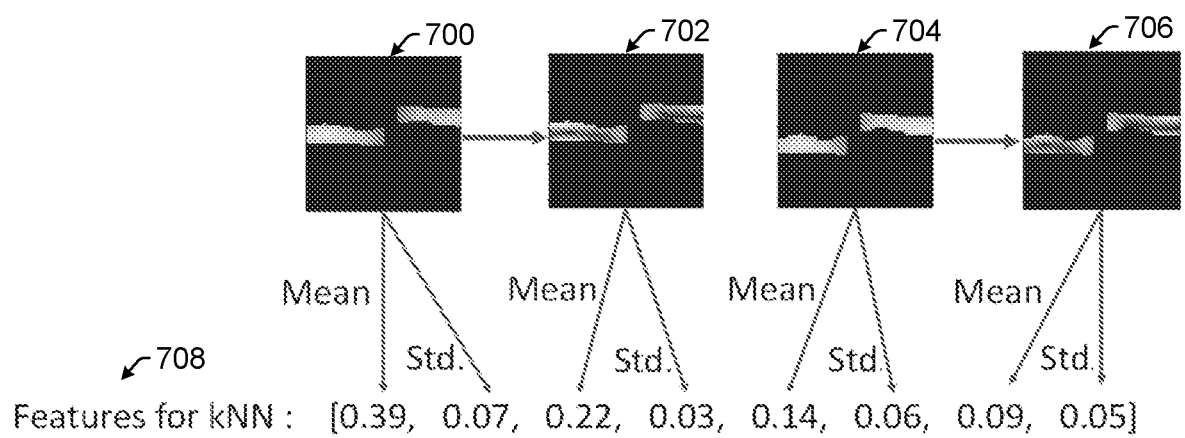
FIG. 7 is a schematic diagram illustrating one embodiment of a modified specimen image and multiple corresponding images and an attribute of a defect detected in a specimen image corresponding to the modified specimen image.

In another such embodiment, the attribute of the defect includes a set of values related to the attribute, and the set of values includes a mean and a standard deviation of the attribute of the defect in the specimen image and one or more other specimen images generated at a location of the defect on the specimen and a mean and a standard deviation of the attribute of the defect in each gradient image generated for the specimen image and the one or more other specimen images. For example, as shown in FIG. 7, the computer subsystem may extract some attributes based on intensity or one of the other attributes described herein to find the kNN for each pattern. In this example, image 700 may be a first modified specimen image, and image 702 may be a gradient image calculated from image 700. Image 704 may be a second modified specimen image, and image 706 may be a gradient image calculated from image 704. The first and second modified specimen images shown in this figure may be generated from first and second specimen images, respectively. The first and second specimen images may be generated at the same specimen location (and therefore in many of the applications described herein at the same defect location) but with one or more different parameters such as focus.

The computer subsystem may determine attributes (or features) 708 for kNN. As shown in FIG. 7, these attributes (or features) may include a mean and standard deviation value for each of images 700, 702, 704, and 706. The computer subsystem may also compute the mean and standard deviation within the pattern mask region. Such values may be particularly suitable for an attribute such as intensity. The values that are determined by the computer subsystem may vary depending on the attribute that is being used in the embodiments described herein.

In this manner, the computer subsystem may define a number of values, e.g., 8 values, for an attribute such as intensity for each of the specimen images and gradient images for each of the specimen images, and these determined values may be saved in a KD-tree. In other words, the mean and standard deviation of each of the patches and each of the gradients of the patches may be used as attributes in the kNN step. The computer subsystem may therefore determine some statistical attribute values for patterns, which can be used in kNN to look for patterns that are most likely to be similar. For example, for similar patches, the 8 values for the attribute described above should be almost the same, so kNN performed using the values can help to filter out the patches that are not similar at all. In other words, using the 8 attribute values described above, the computer subsystem can filter out defects that are substantially different. If two defects are similar and can be grouped together, the 8 attribute values of those defects should be the same or almost the same, and they are expected to be selected in the kNN. While these 8 attribute values can roughly describe a patch for the purposes described herein, it is also possible that other sets of attributes can be used to achieve similar results.

In a further such embodiment, the computer subsystem is configured for classifying defects detected on the specimen by assigning a first classification to the specimen image and all other specimen images assigned to the one of the multiple final groups and assigning a second classification to all additional specimen images assigned to a second of the multiple final groups. The defects in the different final groups may be classified as described further herein.

The computer subsystem is also configured for generating results that include the determined information, which may include any of the results or information described herein. The results of determining the information may be generated by the computer subsystem in any suitable manner. All of the embodiments described herein may be configured for storing results of one or more steps of the embodiments in a computer-readable storage medium. The results may include any of the results described herein and may be stored in any manner known in the art. The results that include the determined information may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem described herein may include information for any defects detected on the specimen such as location, etc., of the bounding boxes of the detected defects, detection scores, information about defect classifications such as class labels or IDs, any defect attributes determined from any of the images, etc., predicted specimen structure measurements, dimensions, shapes, etc. or any such suitable information known in the art. That information may be used by the computer subsystem or another system or method for performing additional functions for the specimen and/or the detected defects such as sampling the defects for defect review or other analysis, determining a root cause of the defects, etc.

In addition to the functions described above, such functions include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the determined information. The changes to the process may include any suitable changes to one or more parameters of the process. In one such example, the computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein have a number of advantages over other currently used methods and systems for defect or specimen image grouping. For example, the embodiments described herein provide algorithms and methods for defect or pattern grouping or classification using fast and fuzzy grouping based on hash codes (e.g., in pre-grouping) and optionally kNN (e.g., in optional re-grouping). The embodiments described herein advantageously define a new hash code, which only keeps the low frequency parts of the modified specimen images and can tolerate rotation/flipping/translation of the modified specimen images. With this hash code, the embodiments make possible fuzzy grouping. In addition, as described above, for attribute checking, the computer subsystem may use kNN to find the k nearest candidates for each defect first and then compare the attributes of defect pairs. This approach advantageously reduces the times of comparisons greatly. Furthermore, the computer subsystem remove the patterns that do not touch defects, which further improve the fuzzy capability of the embodiments.

Since the embodiments described herein provide a substantially fast flow and algorithm for fuzzy grouping of similar defects, the embodiments can provide advantages in several different use cases. For example, some currently used inspection tools catch many systematic defects, and most of the systematic defects are similar and false defects. Using the embodiments described herein, all of these similar systematic defects can be grouped together and then collectively and appropriately marked as false defects, which can greatly improve the accuracy of defect detection applications, especially for some inspection processes like those designed for extreme ultraviolet (EUV) applications.

The pre-grouping and re-grouping described herein can be performed at runtime, but they can be performed at other times as well. In addition, even though the embodiments described herein were initially designed primarily for grouping defects detected on masks, they can be applied equally as well to defect and pattern grouping on other specimens such as wafers.

Whether only pre-grouping is performed or both pre-grouping and re-grouping are performed may also be determined on an application-specific basis. One such application may be systematic false defect filtering for masks, where missing real defects is obviously unacceptable. Therefore, it is not acceptable to group a real defect and a false defect together. While the pre-grouping described herein only checks the similarity of patterns, re-grouping can check the attributes of the defects in the same or similar patterns. Some real defects and false defects may be located on similar patterns and will therefore be grouped together by pre-grouping. As such, re-grouping is useful to separate those defects based on the defect attributes. In contrast, in a defect sorting application (another related application), the goal can be to just group defects on similar patterns together and rank them according to an attribute such as signal strength. In this situation, pre-grouping may be sufficient, and checking the defect attributes of defects in the same pre-group is not necessary.

Each of the embodiments described above may be combined together into one single embodiment. In other words, unless otherwise noted herein, none of the embodiments are mutually exclusive of any other embodiments.

Another embodiment relates to a computer-implemented method for determining information for a specimen. The computer-implemented method includes the removing, generating, and assigning steps described herein. The steps are performed by a computer system, which may be configured according to any of the embodiments described herein.

Each of the steps of the method may be performed as described further herein. The method may also include any other step(s) that can be performed by the imaging subsystem and/or computer system described herein. In addition, the method described above may be performed by any of the system embodiments described herein.

Figure 8:
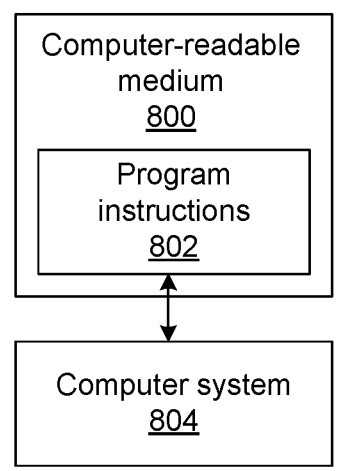
FIG. 8 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for a specimen. One such embodiment is shown in FIG. 8. In particular, as shown in FIG. 8, non-transitory computer-readable medium 800 includes program instructions 802 executable on computer system 804. The computer-implemented method may include any step(s) of any method(s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), Python, Tensorflow, or other technologies or methodologies, as desired.

Computer system 804 may be configured according to any of the embodiments described herein.

Further modifications and alternative embodiments of various aspects of the invention will be apparent to those skilled in the art in view of this description. For example, methods and systems for determining information for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine information for a specimen, comprising:
    an imaging subsystem configured to generate a specimen image of a specimen, wherein the imaging subsystem comprises an energy source configured to generate energy directed to the specimen by the imaging subsystem and a detector configured to detect energy from the specimen and to generate output responsive to the detected energy, and wherein the imaging subsystem is further configured to generate the specimen image from the output generated by the detector; and
    a computer subsystem configured for:
        removing one or more patterns in the specimen image that do not touch a defect detected in the specimen image thereby generating a modified specimen image, wherein said removing causes additional steps performed by the computer subsystem to be unaffected by the one or more patterns not touching the defect;
        generating one or more hash codes for the modified specimen image;
        assigning the specimen image to one of multiple groups based on a distance between the one or more hash codes and one or more other hash codes generated for a second modified specimen image generated for a second specimen image; and
        classifying defects detected on the specimen based on results of said assigning.

2. The system of claim 1, wherein the one or more hash codes comprise a first hash code for the modified specimen image and a second hash code for a rotated version of the modified specimen image.

3. The system of claim 1, wherein the one or more hash codes comprise a first hash code for the modified specimen image and a second hash code for a flipped version of the modified specimen image.

4. The system of claim 1, wherein the one or more hash codes comprise a first hash code for the modified specimen image and a second hash code for a translated version of the modified specimen image.

5. The system of claim 1, wherein generating the one or more hash codes comprises generating a frequency domain image from the modified specimen image, selecting low frequency components of the frequency domain image, and converting the low frequency components into vectors for the one or more hash codes.

6. The system of claim 1, wherein the computer subsystem is further configured for determining the distance, and wherein the distance between the one or more hash codes and the one or more other hash codes comprises a cosine vector distance.

7. The system of claim 1, wherein the computer subsystem is further configured for determining the distance between the one or more hash codes and the one or more other hash codes by determining a first cosine vector distance between a first of the one or more hash codes and a first of the one or more other hash codes, determining a second cosine vector distance between the first of the one or more hash codes and a second of the one or more other hash codes for an altered version of the second modified specimen image, determining a maximum of the first and second cosine vector distances, and setting the distance between the one or more hash codes and the one or more other hash codes equal to the maximum.

8. The system of claim 7, wherein assigning the specimen image to the one of the multiple groups comprises assigning the specimen image and the second specimen image to the one of the multiple groups if the distance between the one or more hash codes and the one or more other hash codes is greater than a threshold.

9. The system of claim 7, wherein the altered version of the second modified specimen image is a rotated version of the second modified specimen image.

10. The system of claim 7, wherein the altered version of the second modified specimen image is a flipped version of the second modified specimen image.

11. The system of claim 7, wherein the altered version of the second modified specimen image is a translated version of the second modified specimen image.

12. The system of claim 1, wherein classifying the defects detected on the specimen comprises assigning a first classification to the specimen image and all other specimen images assigned to the one of the multiple groups and assigning a second classification to all additional specimen images assigned to a second of the multiple groups.

13. The system of claim 1, wherein the computer subsystem is further configured for re-assigning the specimen image assigned to the one of the multiple groups to one of multiple final groups based on an attribute of the defect detected in the specimen image.

14. The system of claim 13, wherein the re-assigning comprises finding k nearest defects for the defect from defects detected in other specimen images assigned to the one of the multiple groups using a k nearest neighbor method, determining a difference between the attribute of the defect and the attribute of one of the k nearest defects, determining if the difference is less than a threshold, and when the difference is less than the threshold, assigning the specimen image and one of the other specimen images corresponding to the one of the k nearest defects to the one of the multiple final groups.

15. The system of claim 13, wherein the k nearest neighbor method is a k-dimensional tree.

16. The system of claim 13, wherein the attribute of the defect is an intensity of the defect.

17. The system of claim 13, wherein the attribute of the defect is a color of the defect.

18. The system of claim 13, wherein the attribute of the defect is a size of the defect.

19. The system of claim 13, wherein the attribute of the defect is an aspect ratio of the defect.

20. The system of claim 13, wherein the attribute of the defect comprises a set of values related to the attribute, and wherein the set of values comprises a mean and a standard deviation of the attribute of the defect in the specimen image and one or more other specimen images generated at a location of the defect on the specimen and a mean and a standard deviation of the attribute of the defect in each gradient image generated for the specimen image and the one or more other specimen images.

21. The system of claim 13, wherein classifying the defects detected on the specimen comprises assigning a first classification to the specimen image and all other specimen images assigned to the one of the multiple final groups and assigning a second classification to all additional specimen images assigned to a second of the multiple final groups.

22. The system of claim 1, wherein the imaging subsystem is further configured to generate the specimen image using light.

23. The system of claim 1, wherein the imaging subsystem is further configured to generate the specimen image using electrons.

24. The system of claim 1, wherein the specimen comprises a mask.

25. The system of claim 1, wherein the specimen comprises a wafer.

26. A non-transitory computer-readable medium, storing program instructions executable on a computer system for performing a computer-implemented method for determining information for a specimen, wherein the computer-implemented method comprises:

generating a specimen image of a specimen with an imaging subsystem, wherein the imaging subsystem comprises an energy source configured to generate energy directed to the specimen by the imaging subsystem and a detector configured to detect energy from the specimen and to generate output responsive to the detected energy, and wherein the imaging subsystem is further configured to generate the specimen image from the output generated by the detector;

removing one or more patterns in the specimen image that do not touch a defect detected in the specimen image thereby generating a modified specimen image, wherein said removing causes additional steps performed by the computer subsystem to be unaffected by the one or more patterns not touching the defect;

generating one or more hash codes for the modified specimen image;

assigning the specimen image to one of multiple groups based on a distance between the one or more hash codes and one or more other hash codes generated for a second modified specimen image generated for a second specimen image; and classifying defects detected on the specimen based on results of said assigning.

27. A computer-implemented method for determining information for a specimen, comprising:

generating a specimen image of a specimen with an imaging subsystem, wherein the imaging subsystem comprises an energy source configured to generate energy directed to the specimen by the imaging subsystem and a detector configured to detect energy from the specimen and to generate output responsive to the detected energy, and wherein the imaging subsystem is further configured to generate the specimen image from the output generated by the detector;

removing one or more patterns in the specimen image that do not touch a defect detected in the specimen image thereby generating a modified specimen image, wherein said removing causes additional steps performed by the computer subsystem to be unaffected by the one or more patterns not touching the defect;

generating one or more hash codes for the modified specimen image;

assigning the specimen image to one of multiple groups based on a distance between the one or more hash codes and one or more other hash codes generated for a second modified specimen image generated for a second specimen image; and classifying defects detected on the specimen based on results of said assigning, wherein said removing, generating the one or more hash codes, assigning, and classifying are performed by a computer system.

* * * * *